April 10, 1945. C. W. MORRIS 2,373,139
SETTABLE MANIFOLD PRESSURE CONTROLS FOR AIRCRAFT
Filed Feb. 13, 1940
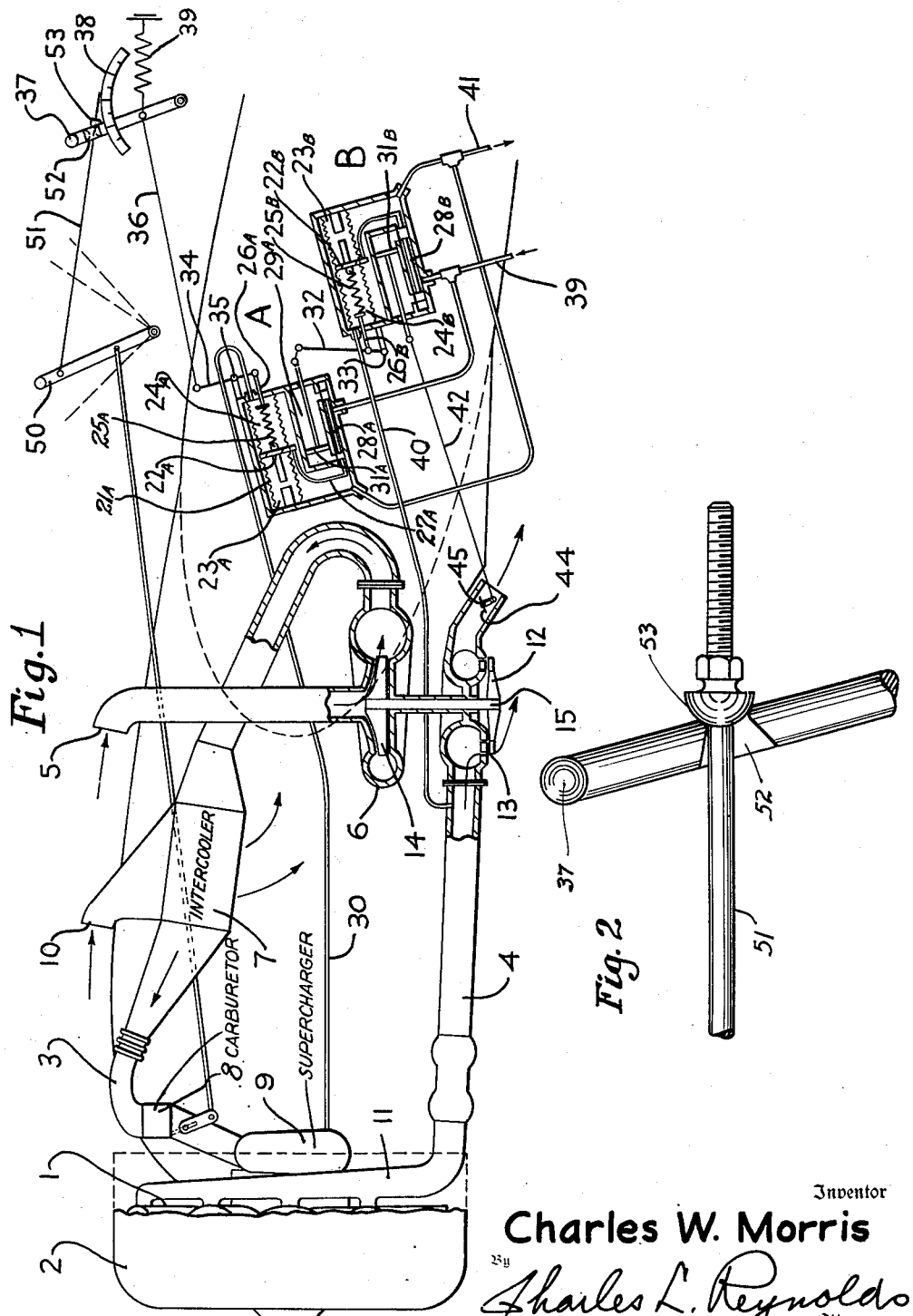
Inventor
Charles W. Morris
By Charles L. Reynolds
Attorney Patented Apr. 10, 1945

2,373,139

UNITED STATES PATENT OFFICE 2,373,139

SETTABLE MANIFOLD PRESSURE CONTROL FOR AIRCRAFT

Charles W. Morris, Seattle, Wash., assignor to Boeing Aircraft Company, Seattle, Wash., a corporation of Washington Application February 13, 1940, Serial No. 318,729

10 Claims. (Cl. 60—13)

In the present state of the art, the pressure delivered to the carburetor of an aircraft engine is regulated by variation of the compressor's rotational speed. In the case where the compressor is driven by the exhaust gas, acting, for instance, through a turbine, this variation is accomplished by means of a shutter or waste gate on the waste outlet on the exhaust gas system. An automatic regulator is connected to maintain a constant carburetor inlet air pressure or a constant exhaust pressure.

With the present turbo regulating systems there are imperfections. In the case where the regulation is intended to maintain a constant carburetor inlet pressure, the inertia of the turbine and compressor elements are so great that a continuous surging is inherently occurring. This surging is repetitious. In the case of the system which is intended to maintain a constant exhaust pressure, the surging is eliminated but another characteristic necessitates the pilot's attention must be directed to the manifold pressure gauge intermittently. This characteristic is that the exhaust pressure is not constant for equal engine power at all altitudes, hence the pilot must reset the turbo control periodically as the airplane changes altitude. At the present time there is no means whereby the pilot may set the turbo controls according to an indexed manifold pressure, or power, prior to running the engines up to power to determine where the control setting should be for the particular altitude of the airplane and speed of the engine.

The object of this invention is, broadly, to provide a control which may be set according to a predetermined index in the pilot's compartment, and which will maintain constant manifold pressure and/or engine power at all altitudes within the limitations of the turbo-engine combination. It can be used to maintain constant manifold pressure and/or engine torque with varying engin speed (R. P. M.) within the normal flight range of engine speeds and altitudes.

While it has been attempted heretofore to effect regulation in part through an automatic regulator, such a regulator was not in itself adequate to accomplish fully automatic control, and it was still necessary for the engineer officer to effect repeated manipulation of the controls as the altitude changed. It is a further object of this invention, by the use of two such regulators, and by the nature of their connection to each other and in the system as a whole, to accomplish fully automatic regulation of the manifold pressure, and furthermore, to do so with individual units of known reliability, reasonable simplicity, and light weight.

While it is necessary to open the engine throttle to a certain degree before manipulating the supercharger or manifold pressure control, the adjustment of the supercharger control follows and generally corresponds to the adjustment of the throttle lever, from that point on. It is therefore possible to interconnect the manifold pressure control and the throttle lever or equivalent, with suitable initial lost motion means, so that adjustment of one effects corresponding adjustment of the other. This is only possible when, as here, a given setting of the manifold pressure control corresponds, not at one altitude only, but at all altitudes, to a given, known manifold pressure and engine torque. Indeed, there is now afforded the possibility of interconnecting with the manifold pressure controls various other controls, related to engine torque or power, for corresponding or simultaneous adjustment, and all such possibilities flow from the capability, now for the first time realized, of calibrating the control for the manifold pressure, regardless of altitude changes.

With these and other objects in mind, as will appear hereafter, my invention comprises the novel system as a whole, and the novel combination and arrangement of the parts thereof, as shown in the accompanying drawing, and as will be described in this specification and more particularly defined by the claims which terminate the same.

The accompanying drawing shows diagrammatically an engine intake and exhaust manifold system, with a turbo-supercharger and a direct-driven supercharger, and with the controls arranged with relation to the elements of the manifold and exhaust system, in an arrangement such as is at present preferred by me. It will be understood, however, that the system is purely diagrammatically illustrated, and that the arrangement is typical only.

Fig. 1 is a diagrammatic view of the system as a whole, while Fig. 2 is an enlarged diagrammatic view of a manual control incorporated in such system as shown in the upper right portion of Fig. 1.

The engine is illustrated at 1, concealed within a cowl ring 2; to the engine leads the intake manifold 3, and from it leads the exhaust stack 4. In normal practice atmospheric air for supply to the engine, for the combustion of the fuel, is taken in at a suitable point, typified by the scoop 5, is led through a turbo-supercharger 6, where it is compressed, thence through an intercooler 7 to the carburetor 8, and finally to a direct-driven supercharger 9, which is normally formed as part of the engine itself. The intercooler, the carburetor, and the rotary supercharger 9 may be each of normal or standard design, and connected in the usual or known way; their precise construction being immaterial, and changeable at will, so far as the present invention is concerned, it is not considered necessary, to illustrate them in detail, the more particularly as the drawing is diagrammatical in nature. The structure of the compressor 9 is substantially the same as that of the compressor 6, save that the compressor 9 is driven directly from the engine 2, being built into the engine as is shown in the patent to Parkins, No. 2,170,974, instead of being driven (as in the compressor 6) from an exhaust gas turbine. Air taken in at 10 passes through the intercooler 7, but does not mingle with the air which passes through the manifold 3; it merely serves to cool the air in the manifold, which has been heated by compression at the supercharger 6. The cooling air may be discharged within the nacelle.

The exhaust gases leave the engine by way of a collector ring 11, and pass thence to the exhaust stack 4, in which is connected an exhaust turbine, represented by the impeller 12. The amount or proportion of exhaust gas which passes through the turbine ports 13 to rotate the impeller 12 is determined by the setting of a waste gate 44 beyond the exhaust turbine. The wider the waste gate 44 is open, the less is the exhaust gas compelled to pass through the ports 13, and the less power is developed by the turbine 12, hence the less compression of air by the supercharger 6. The impeller 14 of the supercharger is shown as mounted upon a shaft 15 which is common to the impeller 12 of the exhaust turbine, to indicate that the speed of rotation and rate of compression by the supercharger 6 is a function of the speed of rotation of the impeller 12, which in turn is governed by the setting of the waste gate 44, and by the pressure of the surrounding atmosphere, and the consequent pressure drop through the ports 13. Lower atmospheric pressure creates, in general, a greater pressure drop, and induces higher speed of the exhaust turbine, for any given exhaust pressure, but any increased speed thereby attained by the turbo-supercharger does not produce corresponding increase of pressure in the intake manifold 3, for the reason that the air admitted at 5 at high altitudes is more rarefied and therefore must be more greatly compressed—more work must be performed upon it—to maintain a constant pressure in the manifold 3.

In the regulation of such a system it has been known heretofore to use a regulator of a type shortly to be described, but to use one such regulator only. In consequence it was necessary to effect repeated regulation as the altitude and the external pressure changed. According to the present invention two such regulators, each of known form and characteristics, are employed in combination, and are relatively arranged in a special way so that each affects the other. They are connected, one to the intake manifold, to be subject to the pressure thereof, and the other to the exhaust stack, to be subject to the pressure therein. One such regulator is connected to the waste gate, to control its setting, and the other regulator is connected to a single control element in the control cabin, which can be calibrated and set to maintain, through the interaction of the two regulators upon the waste gate, a given manifold pressure corresponding to the calibration of the control unit.

The two regulators may be designated, to distinguish them, by the letters A and B, and the corresponding parts, whenever necessary, will be distinguished by like suffixes. Since the two regulators are alike in their interior arrangement, and are old per se, a description of the mechanical structure of one (the regulator A, for example) will suffice for the other. Such regulator includes a collapsible Sylphon 21A divided by a diaphgarm 22A between its ends into two chambers 23A and 24A. The chamber 23A is fully evacuated, and hence the diaphragm at this side is subject to no effect which can change with change of altitude. The diaphragm at its opposide side is therefore responsive to any absolute pressure impressed upon it, and this regardless of changes in atmospheric pressure. Within the chamber 24A is located a tension spring 25A, one end of which is anchored to the diaphragm 22A, and the other end of which is anchored to a longitudinally adjustable anchor piece 26A. The latter is adjustable, insofar as the regulator A is concerned, by a lever 34 fulcrumed at 35, and connected by a link 36 to a pivoted and shiftable control arm 37, which is urged to the right by a spring 39, and which is located within the control cabin and movable past a calibrated quadrant 38. The calibrations are determined in accordance with the characteristics of the individual engine, superchargers, and duct work, but once determined are unvarying, unless a change occurs in these elements.

The diaphragm 22A is connected by an arm 27A to shift the valve 28A of a servo device, consisting of a piston 31A movable within a cylinder 29A. Suitable pressure fluid, usually available aboard aircraft for operation of various instrumentalities, is supplied to one or the other of the opposite ends of the cylinder 29A, in accordance with the setting of the valve 28A, by means of the pressure supply line 39, and fluid is discharged from the regulator by means of the discharge line 41.

The piston 31A is connected to operate a desired instrumentality, and in arrangements of the general nature described, such as have been used heretofore, the piston of the single regulator has been connected to the waste gate. In the present arrangement, however, wherein two such regulators are employed, the piston 31A of the regulator A is connected to control the tension of the spring 25B of the regulator B, acting through a piston-controlled lever 32 fulcrummed at 33 and connected to the anchor member 26B. The interior structure of the regulator B being similar to that of regulator A, it is not necessary to describe it in detail. It is only necessary to point out that the piston 31B is connected through a link 42 to swing the waste gate 44 upon its pivot 45.

Referring now to the interrelation between the regulators A and B, it is desired to point out, first, that the evacuated chamber 23A does not, at any altitude, resist the tendency of the tensioned spring 25A to draw the diaphragm 22A to the right. There is a tendency, due to the tension of the spring 25A, to move the diaphragm 22A to the right, and this tendency is resisted only by pressure within the chamber 24A. This pressure is the absolute pressure of the intake manifold (or the pressure beyond the direct-driven supercharger 9) communicated through the conduit 30 to the interior of the chamber 24A. When this pressure and the tension of the spring 25A are equal, parts are in position of equilibrium, and during movement to this position of equilibrium the control valve 28A has been displaced in one direction or another, and the piston 31A has been correspondingly shifted.

Since the piston 31A is operatively connected to shift the anchorage 26B on the spring 25B of the regulator B, the spring 25B is given a tension of a value which is a function of the intake manifold pressure, acting through regulator A, and this tension of spring 25B is brought into equilibrium with pressure within the chamber 24B, which pressure is the absolute exhaust pressure within the stack 4, communicated to the chamber 24B through the conduit 40. Again this equilibrium between the tension of spring 25B and of the exhaust pressure within the chamber 24B is wholly independent of pressure altitude effects, because of the total evacuation of the chamber 23B.

Movement of the diaphragm 22B, prior to the time it reaches its position of equilibrium, has effected shifting of the control valve 28B in one direction or another. This in consequence has effected movement of the piston 31B, in the manner already described with reference to the regulator A. When parts reach a position of equilibrium the piston 31B has moved the waste gate 44 to a position such that the absolute exhaust pressure within the manifold accomplishes precisely the desired rate of rotation, and develops precisely the correct amount of power in the exhaust turbine 12 as to produce and maintain at the supercharger 6 the correct absolute pressure in the intake manifold, or, when the supercharger 9 is also used, to produce and maintain beyond the supercharger 9 the correct absolute pressure at the engine intake.

Assuming a given setting of the control arm 37, should the manifold pressure tend to increase (as it might when the airplane is descending), the pressure within the chamber 24A tends to increase, thereby shifting the diaphragm 22A and the valve 28A to the left. In consequence the piston 31A tends to move to the right, thereby decreasing the tension of the spring 25B, and disturbing the equilibrium of the regulator B. By reason of the decreased tension of the spring 25B the diaphragm 22B tends to move to the right, under the influence of the unchanged absolute exhaust pressure, and the valve 28B, which is connected to the diaphragm 22B, likewise moves to the right. The piston 31B consequently moves to the left, and the waste gate 44, pivoted at 45, is thereby swung open slightly more. This decreases the exhaust pressure in the stack 4, and in the conduit 40, thereby decreasing the speed and power output of the exhaust turbine 12, 13, in turn reacting to decrease the manifold pressure and the pressure within the chamber 24A. Decrease of pressure within the chambers 24A and 24B again equalizes the decreased spring tension of the two regulators, and parts assume a new position of equilibrium with the original tendency to increase the manifold pressure counteracted, and the manifold pressure returned again to the pressure corresponding to the setting of the control arm 37.

Should the manifold pressure tend to decrease, the opposite action follows automatically, and the increased power output of the exhaust turbine maintains automatically the set manifold pressure. If a change occurs in the exhaust pressure, whether increase or decrease, it will be clear that such a change reacts through the interconnected regulators, alters the setting of the waste gate automatically and compensatingly, and the manifold pressure still is kept unchanged.

If it is desired to alter the manifold pressure, it is only necessary to move the control arm 37. Movement of the control arm to the left tends to increase the tension of the spring 25A, and by following the system through it will be seen that this produces an increase in manifold pressure and in exhaust pressure, and that parts assume a new position of equilibrium to maintain the intake pressure at the more elevated point. Each setting of the control arm 37 corresponds to one manifold pressure, and to that pressure only, so that the control arm 37 may be calibrated with respect to its quadrant 38, and it will be known that for that setting, regardless of altitude changes or other changes of atmospheric pressures, the manifold pressure will be maintained automatically at the value for which the control arm is set.

Since a change in power output is accomplished by or accompanied by a change of setting of other controls, for instance, the throttle lever 50, and requires a corresponding change in manifold pressure, it is possible to interconnect the throttle lever 50 and the control arm 37. A link 51, fast to the throttle lever 50, extends through a guide 52 on the control arm 37, and a stop 53 upon the link 51 engages the control arm 37, after a given free opening movement of the throttle lever, to move the arm 37 in opposition to its return spring 39. Thereafter further opening movement of the throttle accomplishes corresponding adjustment of the control arm, increased fuel delivery entailing increased manifold pressure. The stop 53 may be suitably adjustable along the link 51 to vary the extent of lost motion. While the arrangement shown is not intended to portray structural details of any particular installation, because the construction of different installations differs so greatly, it illustrates the possibility of interconnecting the control arm with another related control, typified by the throttle lever. It is not necessary that they be interconnected, for the manifold pressure control system diagrammatically shown and described is of value per se, but by the employment of such a manifold pressure control system it is possible, for the first time, to effect such an interconnection. It is this possibility, arising from the novel manifold pressure control system, which is of importance, rather than details of the precise manner of their interconnection.

What I claim as my invention is:

1. In an airplane, in combination with the propelling engine, the exhaust stack leading therefrom, and the intake manifold leading therefrom, a supercharger discharging into the intake manifold, a motor connected to the exhaust stack to be driven by the pressure of the exhaust gas, and operatively connected to drive the supercharger, a first regulator including a Sylphon having a diaphragm dividing it into an evacuated chamber and a pressure chamber, a conduit connecting the intake manifold to the pressure chamber, a spring resisting the absolute manifold pressure, to determine a position of equilibrium of the diaphragm, but only so long as the absolute manifold pressure remains unchanged, a second similar regulator, a second conduit connecting the exhaust stack, adjacent the motor, with the pressure chamber of the second Sylphon, a spring resisting the absolute exhaust pressure within the second Sylphon's pressure chamber, to determine a position of equilibrium of the second diaphragm, but only so long as the absolute exhaust pressure remains unchanged, means operatively connecting the first diaphragm to the second spring, whereby variation of the manifold pressure alters the position of equilibrium of the second regulator, and a member operatively connected to the second diaphragm, and shiftable under the influence of change in position of the second diaphragm, whether due to change in manifold pressure indirectly affecting the second diaphragm, or to change in exhaust pressure directly affecting the second diaphragm, to vary the exhaust pressure automatically and compensatingly, thereby to maintain the manifold pressure in correspondence with any given setting of the first spring.

2. In an airplane, in combination with the propelling engine, the exhaust stack leading therefrom, and the intake manifold leading therefrom, a supercharger discharging into the intake manifold, a motor connected to the exhaust stack to be driven by the pressure of the exhaust gas, and operatively connected to drive the supercharger, a first regulator including a Sylphon having a diaphragm dividing it into an evacuated chamber and a pressure chamber, a conduit connecting the intake manifold to the pressure chamber, a spring resisting the absolute manifold pressure, to determine a position of equilibrium of the diaphragm, but only so long as the absolute manifold pressure remains unchanged, a second similar regulator, a second conduit connecting the exhaust stack, adjacent the motor, with the pressure chamber of the second Sylphon, a spring resisting the absolute exhaust pressure within the second Sylphon's pressure chamber, to determine a position of equilibrium of the second diaphragm, but only so long as the absolute exhaust pressure remains unchanged, means operatively connecting the first diaphragm to the econd spring, whereby variation of the manifold pressure alters the position of equilibrium of the second regulator, a member operatively connected to the second diaphragm, and shiftable under the influence of change in position of the second diaphragm, whether due to change in manifold pressure indirectly affecting the second diaphragm, or to change in exhaust pressure directly affecting the second diaphragm, to vary the exhaust pressure automatically and compensatingly, thereby to maintain the manifold pressure in correspondence with any given setting of the first spring, and means to vary the setting of the first spring, thereby to compel a readjustment of the two Sylphons to new and corresponding positions of equilibrium, corresponding to a different manifold pressure.

3. In combination with an aircraft propelling engine, a throttle lever, a supercharger, an intake manifold to conduct air from the supercharger to the engine, an exhaust stack, a motor connected to the exhaust stack to be driven by the pressure of the exhaust gas, and operatively connected to drive the supercharger, a member to vary the exhaust pressure effective to drive the motor, means to regulate the setting of said member automatically by and in accordance with change in exhaust pressure or change of manifold pressure, or both, to maintain automatically substantially constant manifold pressure, a control settable to alter the setting of said regulating means, thereby to change the value of the set manifold pressure, and means interconnecting said throttle lever and said control, operable to move conjointly said throttle lever progressively towards open position and simultaneously with said throttle lever movement said control progressively to effect an increase in the manifold pressure.

4. In combination with an aircraft propelling engine, a throttle lever, a supercharger, an intake manifold to conduct air from the supercharger to the engine, an exhaust stack, a motor connected to the exhaust stack to be driven by the pressure of the exhaust gas, and operatively connected to drive the supercharger, a member to vary the exhaust pressure effective to drive the motor, means to regulate the setting of said member automatically by and in accordance with change in exhaust pressure or change of manifold pressure, or both, to maintain automatically substantially constant manifold pressure, a control settable to alter the setting of said regulating means, thereby to change the value of the set manifold pressure, and means interconnecting said throttle lever and said control, operable to move conjointly said throttle lever progressively towards open position and simultaneously with said throttle lever movement said control progressively to effect an increase in the manifold pressure, said interconnection including a lost motion device, to permit limited opening movement of the throttle lever prior to initiating increase of manifold pressure.

5. In combination with an aircraft-propelling internal combustion engine and a throttle control therefor, automatic control mechanism for a supercharger driven by the exhaust gas from said engine, and delivering air to the intake of such engine, comprising means responsive to pressure changes in such air intake, a control for regulating the amount of exhaust gas serving to drive said supercharger, means responsive to changes in pressure in the exhaust manifold, motor means automatically and compensably operated in response to operation of said intake pressure responsive means and said exhaust pressure responsive means, operating to move said supercharger control to restore said intake pressure responsive means to its initial position, manual motor control means adjustable at will to alter the initial setting of the intake pressure responsive means, and means interconnecting said manual motor control means and said throttle control operable to effect simultaneous and corresponding progressive control movement of said manual means to effect an increase in manifold pressure and of the throttle control toward throttle open position.

6. In combination with an aircraft propelling engine, a compressor arranged to deliver air to the engine, a controllable motor arranged to receive exhaust gas from the engine, to be driven by the effective pressure thereof, and operatively connected to drive the compressor, engine throttle control means settable in various positions in accordance with varying engine speed requirements, and means operatively connected between said throttle control means and the motor to regulate the latter progressively in response to movement of said throttle means toward open position and prior to reaching its position of maximum throttle opening, said last-mentioned means including means automatically operable under the influence of atmospheric pressure variations, as reflected in intake and/or exhaust pressure variations, to regulate the motor automatically in accordance with such pressure changes, to maintain a constant compressor output at any given setting of said throttle control means, regardless of atmospheric pressure changes.

7. In combination with an aircraft propelling engine, a compressor arranged to deliver air to the engine, a controllable motor arranged to receive exhaust gas from the engine, to be driven by the effective absolute pressure thereof, and operatively connected to drive the compressor, engine throttle control means settable in various positions in accordance with varying engine speed requirements, and means operatively connected between said throttle control means and the motor to regulate the latter by movement of said throttle means prior to reaching its position of maximum throttle opening, said last-mentioned means including means automatically operable under the influence of variations in the absolute pressure of the exhaust or of the compressor output, or both, to regulate the motor correspondingly and compensably, to maintain a constant absolute compressor output, for any given setting of said throttle control means.

8. In combination with an aircraft propelling engine, a compressor delivering air to the engine, a motor receiving exhaust gas from the engine, to be driven by the effective absolute pressure thereof, and operatively connected to drive the compressor, engine throttle control means settable in various positions in accordance with varying engine speed requirements, and means operatively connected with said throttle control means, and operable to vary the exhaust pressure effective to drive the motor as said engine throttle control means is moved to vary the throttle opening, said last-mentioned means including means to vary such effective exhaust pressure automatically in accordance with changes in absolute pressure of both the exhaust gas and the compressor.

9. In combination with an aircraft propelling engine, a compressor delivering air to the intake manifold of the engine for varying the power delivered thereby, a motor driving said compressor and driven by exhaust gas from the engine, and motor regulating means including two regulators, one of said regulators being actuated by exhaust gas pressure and directly operable to vary the effectiveness of the exhaust gas to drive said motor and incorporating a spring balancing such exhaust gas pressure, the other regulator being actuated by intake manifold pressure, and means directly connecting the intake manifold pressure actuated regulator to said spring of the exhaust gas pressure actuated regulator for varying the tension thereof in response to operation of such intake manifold pressure actuated regulator.

10. In combination with an aircraft propelling engine, a compressor delivering air to the intake manifold of the engine for varying the power delivered thereby, a motor driving said compressor and driven by exhaust gas from the engine, and motor regulating means including two regulators actuated by exhaust gas pressure and by intake manifold pressure respectively, one of said regulators being directly operable to vary the effectiveness of the exhaust gas to drive said motor and incorporating a spring balancing its actuating pressure, and means directly connecting the other regulator to said spring for varying the tension thereof in response to operation of such other regulator.

CHARLES W. MORRIS.